United States Patent
Owens et al.

(10) Patent No.: US 7,406,548 B2
(45) Date of Patent: Jul. 29, 2008

(54) SYSTEMS AND METHODS FOR RESPONDING TO A DATA TRANSFER

(75) Inventors: James W. Owens, Fort Collins, CO (US); Daniel Bloom, Loveland, CO (US); James S. Voss, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 10/811,119

(22) Filed: Mar. 26, 2004

(65) Prior Publication Data

US 2005/0216618 A1 Sep. 29, 2005

(51) Int. Cl.
*G06F 13/00* (2006.01)

(52) U.S. Cl. .................. 710/60; 710/61; 710/29; 709/233; 348/211.9

(58) Field of Classification Search .......... 710/60, 710/61, 29; 709/233; 348/211.9
See application file for complete search history.

(56) References Cited

U.S. PATENT DOCUMENTS

| | | | |
|---|---|---|---|
| 4,696,004 A * | 9/1987 | Nakajima et al. ........... 714/736 |
| 5,315,571 A | 5/1994 | Maeda et al. |
| 5,563,655 A * | 10/1996 | Lathrop .................... 348/231.9 |
| 5,579,502 A | 11/1996 | Konishi et al. |
| 5,815,426 A | 9/1998 | Jigour et al. |
| 5,877,975 A | 3/1999 | Jigour et al. |
| 6,067,398 A | 5/2000 | Sato |
| 6,285,659 B1 | 9/2001 | Feuerstraeter et al. |
| 6,362,851 B1 | 3/2002 | Lavelle et al. |
| 6,442,628 B1 * | 8/2002 | Bastiani et al. .............. 710/60 |
| 6,449,426 B1 | 9/2002 | Suga et al. |
| 6,510,520 B1 | 1/2003 | Steinberg |
| 6,538,758 B1 | 3/2003 | Ikegawa |
| 6,545,891 B1 | 4/2003 | Tringali et al. |
| 6,658,516 B2 | 12/2003 | Yao |
| 6,663,007 B1 | 12/2003 | Sun et al. |
| 6,980,594 B2 * | 12/2005 | Wang et al. ............ 375/240.12 |
| 7,007,116 B2 * | 2/2006 | Odakura et al. .............. 710/52 |
| 7,149,825 B2 * | 12/2006 | Bunker et al. ................ 710/60 |
| 2002/0003576 A1 * | 1/2002 | Konishi et al. ............. 348/232 |
| 2002/0131758 A1 * | 9/2002 | Austin ........................ 386/46 |
| 2004/0087213 A1 * | 5/2004 | Kao ............................ 439/638 |
| 2005/0080872 A1 * | 4/2005 | Davis et al. ................. 709/217 |

FOREIGN PATENT DOCUMENTS

| | | |
|---|---|---|
| DE | 102 40 882 A1 | 4/2003 |
| EP | 0 039 191 A2 | 11/1981 |
| JP | 02-257341 | 10/1990 |
| JP | 02-257341 A | 10/1990 |
| JP | 05-103291 A | 4/1993 |
| JP | 09-322106 A | 12/1997 |

OTHER PUBLICATIONS

Joe Burns, So you want a thum-nail image, huh?.*

* cited by examiner

*Primary Examiner*—Alford Kindred
*Assistant Examiner*—Ernest Unelus (57) ABSTRACT

Systems and methods for responding to a data transfer are disclosed. One embodiment comprises a method that includes the following steps: determining a sustainable data transfer rate for data transfers to/from an external memory medium, acquiring a data stream, transforming the data stream, and selecting a value for at least one operational parameter associated with acquiring or transforming the data stream in response to the sustainable data transfer rate.

28 Claims, 7 Drawing Sheets

SYSTEMS AND METHODS FOR RESPONDING TO A DATA TRANSFER

BACKGROUND

Many consumer devices are now constructed to generate and/or use digital data in increasingly large quantities. Portable digital cameras for still and/or moving pictures, for example, generate large amounts of digital data representing still images, video clips, and for some devices audio tracks. To provide for this type of data storage application, the storage memory should be relatively low in cost for sufficient capacities of around 10 MB to 1 gigabyte (GB) or more. The storage memory should also be low in power consumption (e.g., <<1 Watt) and have relatively rugged physical characteristics to cope with the portable battery powered operating environment. Preferably the memory should have a short access time (preferably less than one millisecond) and moderate transfer rate (e.g., 20 Mb/s).

One form of storage currently used for application in portable devices such as digital cameras is flash memory. Flash memory meets the desired mechanical robustness, power consumption, transfer, and access rate characteristics mentioned above. However, the read/write speeds of flash memory cards varies greatly from card to card, vendor to vendor, and for individual cards read/write speeds can degrade with age and/or use of the card. The variance in data transfer rates to/from a particular external memory medium can make certain features unavailable in such applications, for example streaming video at the highest resolution and frame rate acquirable on a digital camera.

SUMMARY

One embodiment of a data appliance comprises an acquisition system configured to acquire data in response to an acquisition parameter, a processing system configured to transform acquired data in response to a processing parameter, and a memory interface coupled to the processing system. The data appliance is configured to select a value for at least one of the acquisition parameter and the processing parameter responsive to a sustainable data transfer rate between the memory interface and an external memory medium.

Another embodiment is a method for dynamically processing data. The method comprises the following: determining a sustainable data transfer rate between a data appliance and an external memory medium, selecting a value for at least one operational parameter in response to the sustainable data transfer rate, and processing data in accordance with the at least one operational parameter.

Other embodiments are also disclosed.

BRIEF DESCRIPTION OF THE DRAWINGS

The present systems and methods for responding to a data transfer, as defined in the claims, can be better understood with reference to the following drawings. The components within the drawings are not necessarily to scale relative to each other, emphasis instead is placed upon clearly illustrating the principles of the systems and methods.

DETAILED DESCRIPTION

Some systems and methods described herein for responding to a data transfer measure or otherwise determine a sustainable data transfer rate between a data appliance and an external memory medium. Most embodiments will determine a sustainable data transfer rate that is optimized for a particular confidence level that data transfers to/from a particular external memory medium will be successful when data is transferred to/from the data appliance at the sustainable data transfer rate. By measuring and responding to actual data transfer rates, improved data characteristics can be met while still streaming data to/from the external medium. Data transfer calibration can be implemented at system start up and/or at other unobtrusive times during system operation as may be desired.

Sustained data transfer rates can be determined by forwarding a test file via a memory interface to an external memory medium. The test file contains a digital representation of video data. Any of a number of methods may be used to determine a sustainable data transfer rate for data write or data read operations. Some described methods read or write the test file at an initial bit rate that matches the maximum rate supportable by the data appliance. If a data transfer error is detected, an interim bit rate less than the initial bit rate by a predetermined amount is used for the remainder of the data transfer and/or subsequent data transfers. After the bit rate has been decreased, the data transfer resumes until another data transfer error condition occurs or the data transfer is completed. Data transfers and bit rate adjustments repeat until no data error is detected during a transfer of the test file.

An alternative method starts with an initial bit rate that is slower than that required to support the transfer of the desired data stream directly to/from the external memory medium for a set of desired operational parameters. The test file is written to or read from the external memory medium at the initial bit rate. If a data transfer error is detected, a suitable error message indicating that the external medium cannot support the desired data quality is communicated to an operator of the data appliance via a user interface. If no error condition is detected, the initial bit rate is increased by a predetermined amount and the test file is transferred again. The test file transfer, error condition monitoring, and bit rate adjustment steps are repeated until a data transfer error is detected or the data appliance reaches its maximum data transfer rate. When a data transfer error is encountered, the data appliance may use the last bit rate associated with a successful file transfer or may reduce the last bit rate by some other predetermined amount or by a predetermined percentage of the bit rate that produced the data transfer error. When the alternative bit rate adjustment is contemplated, the data appliance will be configured to confirm that the test file can be successfully transferred to/from the external memory medium at the final bit rate.

Additional methods for determining a sustainable data transfer rate between a data appliance and an external memory medium may be implemented within contemplated systems for responding to a data transfer. Select additional and previously described methods for determining a sustainable data transfer rate may be implemented for monitoring data write operations (i.e., data transfers to an external memory medium) with the same or different methods used for monitoring data read operations (i.e., data transfers from an external memory medium) as may be desired.

After a sustainable data transfer rate is determined, in some embodiments the systems and methods select a value for an operational parameter within the data appliance to maximize the quality of data that can be streamed to the external memory medium. Operational parameters include data acquisition parameters and data processing parameters. Data acquisition parameters are those variables that determine the nature of the acquired data stream. Data acquisition parameters include spatial resolution and/or frame rate. Data processing parameters are those variables that determine the nature of data compression performed on the acquired data stream. Data processing parameters include bit rate, frame type, and search area for motion vectors. After determining the sustainable read/write speed of the current external memory card in use, one or more values associated with operational parameters can be selected to dynamically match the data rate generated on the data appliance to the sustainable data transfer speed. Selection of values associated with operational parameters includes the selection of a predetermined set of operational parameters for a range of sustainable data transfer rates.

Figure 1:
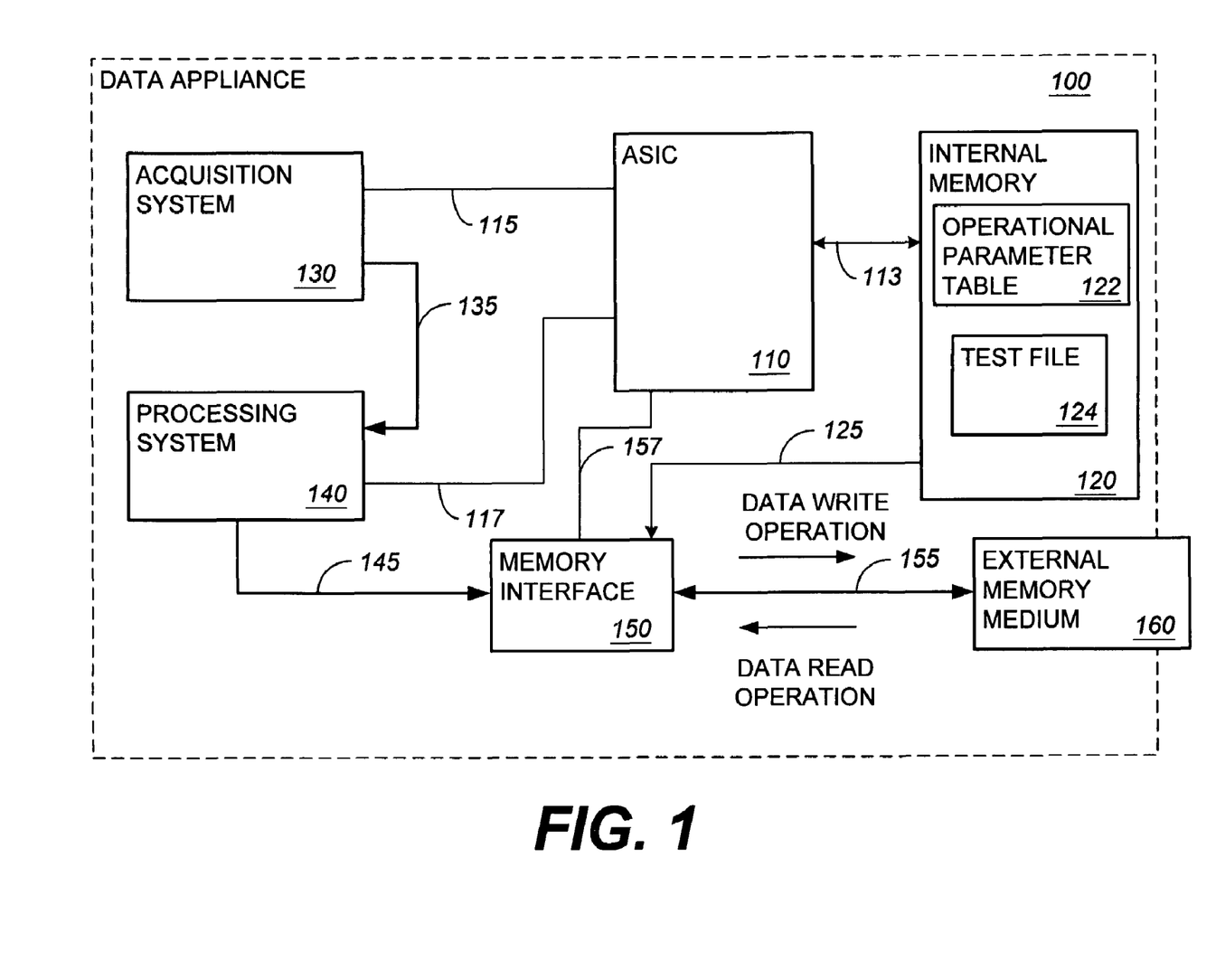
FIG. 1 is a block diagram illustrating an embodiment of a data appliance.

Turning to the drawings that illustrate various embodiments of systems and methods for responding to a data transfer, FIG. 1 is a block diagram illustrating an embodiment of an example data appliance 100. The embodiment illustrated in FIG. 1 includes a single arrangement of functional items configured to respond to a data transfer by selecting a value associated with at least one operational parameter in response to a sustained data transfer rate between the data appliance 100 and an external memory medium 160 coupled to the data appliance 100. It should be understood that data appliance 100 may include additional functional items not illustrated in FIG. 1 and that other arrangements of the illustrated functional items are possible. For example, data appliance 100 may further include a display and/or an operator interface (not shown). Data appliance 100, as illustrated in FIG. 1, includes an application-specific integrated circuit (ASIC) 110, internal memory 120, acquisition system 130, processing system 140, and memory interface 150.

ASIC 110 coordinates and controls the functions of the remaining functional items via various connections with each of the internal memory 120, acquisition system 130, processing system 140, and memory interface 150. As illustrated in FIG. 1, ASIC 110 is coupled to internal memory 120 via connection 113. ASIC 110 retrieves data and executable instructions, stores the same, and coordinates the transfer of data including operational parameters to/from the other functional items and internal memory 120 via connection 113. ASIC 110 processes or otherwise executes executable instructions provided in firmware (not shown) within ASIC 110 or within software provided in internal memory 120.

Acquisition system 130 is coupled to ASIC 110 via connection 115. Acquisition system 130 is configured to obtain and forward data either via connection 115 to ASIC 110 or in alternative modes of operation to processing system 140 via connection 135. Acquisition system 130 captures or otherwise obtains data and forwards the acquired data in accordance with one or more data acquisition parameters. Data acquisition parameters may be stored internally within acquisition system 130 or communicated to acquisition system 130 at select times from ASIC 110 via connection 115.

For example, in one embodiment acquisition system 130 is configured to capture image information. In this embodiment acquisition system 130 includes an image sensor. The image sensor may comprise a charge coupled device (CCD) array or an array of complementary metal-oxide semiconductor (CMOS) sensors. Regardless of whether the image sensor comprises an array of individual CCD elements or CMOS sensors, each of the elements in the array comprises a picture element or pixel of the image sensor. The individual pixels of the image sensor are typically arranged in a two-dimensional array. For example, an array may comprise 2272 pixels in length and 1712 pixels in height.

The image sensor captures an image of a subject-of-interest by converting light incident upon the individual elements of the array into electrical signals. The electrical signals are forwarded to an analog-to-digital converter for converting the analog signal received from the image sensor into a digital signal. When acquisition system 130 is configured to acquire image information over time, the data is acquired in accordance with a controllable spatial resolution and frame rate. Spatial resolution determines the number of pixels that will be used when forming a representation of the captured image. A desired spatial resolution may or may not match the two-dimensional array of sensing elements in the image sensor. When the spatial resolution defines an array size that is lower than that provided by the image sensor, the acquisition system 130 or ASIC 110 will drop some of the information provided by the image sensor. When the desired spatial resolution defines an array size that is higher than that provided by the image sensor, the acquisition system 130 or ASIC 110 will insert data interpolated from closely located pixels to expand the size of the array. Frame rate determines the number of two-dimensional images provided over a fixed period of time (e.g., 30 frames/second).

A movie is usually filmed at a rate of 24 frames per second. This means that every second, there are 24 complete images displayed on the movie screen. American and Japanese television use the national television system committee (NTSC) format, which displays a total of 30 frames per second; but it does this in a sequence of 60 fields, each of which contains alternating lines of the picture. Other countries use the phase alternative line (PAL) format, which displays at 50 fields per second, but at a higher resolution. Because of the differences in frame rate and resolution, video data needs to be formatted for either the NTSC or the PAL system.

Processing system 140 is coupled to ASIC 110 via connection 117. Processing system 140 is configured to receive, format, or otherwise compress data from acquisition system 130 via connection 135 or ASIC 110 via connection 117. Processing system 140 formats and/or compresses data in accordance with one or more data processing parameters. Data processing parameters may be stored internally within processing system 140 or communicated to processing system 140 at select times from ASIC 110 via connection 117.

The compression and transmission of digital video is associated with a series of different disciplines of digital signal processing, each of which can be applied independently. Video data compression includes a few different technical principles; distortion, rate theory, prediction techniques and control theory. Some video compression standards are based on this paradigm (e.g., the moving pictures experts group (MPEG) standards). These video compression standards contain a variety of different coding parameters which may result in different performance depending on their values. When data appliance 100 is configured to acquire and process image information over time, the data is processed by processing system 140 in accordance with a controllable bit rate, frame type, and search area for motion vectors. Bit rate measures the amount of data transferred over a specific time period (e.g., 20 MB/second). Frame type defines how the image data for a specific frame is encoded. Search area defines the maximum displacement of matching blocks of information from one frame to the next. That is, how objects can move between frames if they are to be coded effectively.

While most video compression techniques use some of the techniques used in compressing still image representations to eliminate redundant data, they also use information from other frames to reduce the overall size of a file or video clip. Each frame can be encoded in one of three ways: as an intraframe, a predictive frame, and a bidirectional frame. An intraframe contains the complete image data for that frame. This method of encoding provides the least compression. A predicted frame contains just enough information to display the frame based on the most recently displayed intraframe or predicted frame. This means that the frame contains only the data that relates to how the picture has changed from the previous frame. A bidirectional frame must have the information from the surrounding intraframe or predicted frames. Using data from the closest surrounding frames, it interpolates the position and color of each pixel.

Data processed in accordance with processing parameters is forwarded via connection 145 to memory interface 150. Memory interface 150 can store and retrieve data from an external memory medium 160 via connection 155. As illustrated in FIG. 1, data transfers from memory interface 150 to external memory medium 160 along connection 155 occur during data write operations. Data transfers from external memory medium 160 to memory interface 150 occur during data read operations. External memory medium 160 provides a mechanism for transferring acquired data from the data appliance 100.

Memory interface 150 is further coupled to internal memory 120 via connection 125 and ASIC 110 via connection 157. During a data transfer calibration operation, memory interface 150 retrieves test file 124 from internal memory 120 via connection 125. When a sustainable data write speed is desired, memory interface 150 forwards test file 124 at a predetermined bit rate. An internal system clock and monitoring logic (both not shown) associated with data appliance 100 are used to confirm bit rates associated with transfers of the test file 124. If a data transfer error occurs, memory interface 150 adjusts the bit rate until a sustainable data transfer rate is confirmed. Once confirmed, the sustainable data transfer rate for data write operations to the presently coupled external memory medium 160 is forwarded via connection 157 to ASIC 110.

When a sustainable data read speed is desired, memory interface 150 retrieves and forwards test file 124 to the external memory medium 160. Once the data transfer is complete, memory interface 150 begins to retrieve the test file 124 from external memory medium 160 at a predetermined bit rate. If a data transfer error occurs, memory interface 150 adjusts the bit rate until a sustainable data transfer rate is confirmed. The sustainable data transfer rate for data read operations from the presently coupled external memory medium 160 is forwarded via connection 157 to ASIC 110.

Once a sustainable data transfer rate is established and forwarded to ASIC 110, ASIC 110 forwards one or more operational parameters to acquisition system 130 and/or processing system 140. Distinct values for the operational parameters are associated with a range of sustainable data transfer rates. The distinct values for the various operational parameters are stored in the operational parameter table 122 stored in internal memory 120. Alternatively, the distinct values may be stored within ASIC 110. Note that one or more values associated with respective operational parameters may not change as a result of the data transfer calibration.

Figure 2:
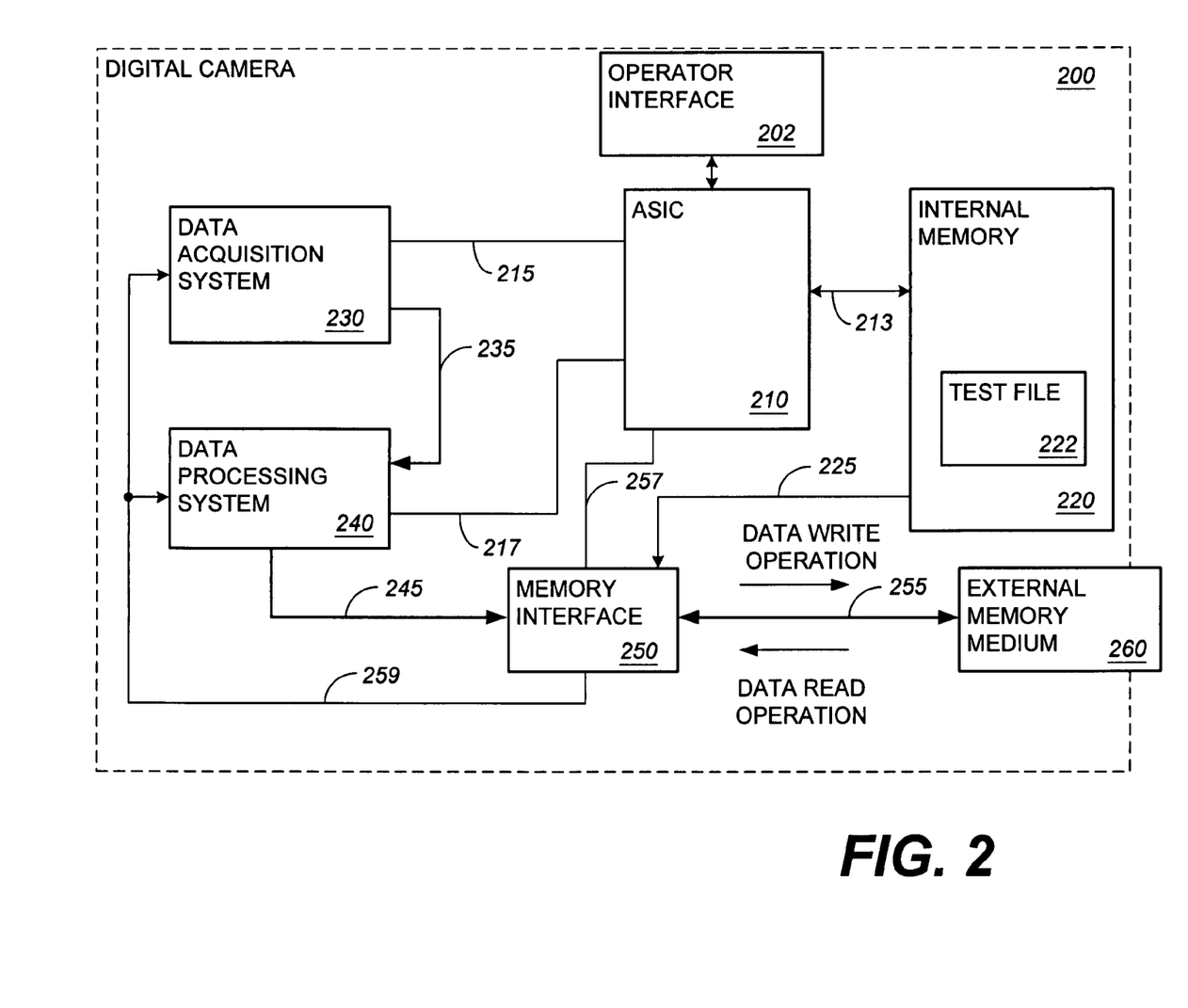
FIG. 2 is a block diagram illustrating an embodiment of a digital camera.

FIG. 2 is a block diagram illustrating an embodiment of a digital camera 200. The embodiment illustrated in FIG. 2 includes a single arrangement of functional items configured to respond to a data transfer by selecting a value associated with at least one operational parameter in response to a sustained data transfer rate between the digital camera 200 and an external memory medium 260 coupled to the digital camera 200. It should be understood that digital camera 200 may include additional functional items not illustrated in FIG. 2 and that other arrangements of the illustrated functional items are possible. For example, operator interface 202 may further include a display (not shown). Digital camera 200, as illustrated in FIG. 2, includes an ASIC 210, internal memory 220, data acquisition system 230, data processing system 240, and memory interface 250.

ASIC 210 coordinates and controls the functions of the remaining functional items via various connections with each of the internal memory 220, data acquisition system 230, data processing system 240, and memory interface 250. As illustrated in FIG. 2, ASIC 210 is coupled to internal memory 220 via connection 213. ASIC 210 retrieves data and executable instructions, stores the same, and coordinates the transfer of data including operational parameters to/from the other functional items and internal memory 220 via connections 213, 215, 217, and 257. ASIC 210 processes or otherwise executes executable instructions provided in firmware (not shown) within ASIC 210 or within software provided in internal memory 220.

Data acquisition system 230 is coupled to ASIC 210 via connection 215. Data acquisition system 230 is configured to obtain and forward data either via connection 215 to ASIC 210 or in alternative modes of operation to data processing system 240 via connection 235. Data acquisition system 230 captures or otherwise obtains data and forwards the acquired data in accordance with one or more data acquisition parameters. Data acquisition parameters may be stored internally within data acquisition system 230 or communicated to data acquisition system 230 at select times from ASIC 210 via connection 215 or from memory interface 250 via connection 259. Data acquisition parameters include spatial resolution and frame rate.

Processing system 240 is coupled to ASIC 210 via connection 217. Processing system 240 is configured to receive, format, or otherwise compress data from acquisition system 230 via connection 235 or ASIC 210 via connection 217. Processing system 240 formats and/or compresses data in accordance with one or more data processing parameters. Data processing parameters may be stored internally within processing system 240 or communicated to processing system 240 at select times from ASIC 210 via connection 217 or via memory interface 250 via connection 259. Data processing parameters include bit rate, frame type, and search area for motion vectors.

Data processed in accordance with data processing parameters is forwarded via connection 245 to memory interface 250. Memory interface 250 can store and retrieve data from an external memory medium 260 via connection 255. As illustrated in FIG. 2, data transfers from memory interface 250 to external memory medium 260 along connection 255 occur during data write operations. Data transfers from external memory medium 260 to memory interface 250 occur during data read operations. External memory medium 260 provides a mechanism for transferring acquired data from the digital camera 200.

Memory interface 250 is further coupled to internal memory 220 via connection 225 and ASIC 110 via connection 257. During a data transfer calibration operation, memory interface 250 retrieves test file 222 from internal memory 220 via connection 225. When a sustainable data write speed is desired, memory interface 250 forwards test file 222 at a predetermined bit rate. An internal system clock and monitoring logic (both not shown) associated with digital camera 200 are used to confirm bit rates associated with transfers of test file 222. If a data transfer error occurs, memory interface 250 adjusts the bit rate until a sustainable data transfer rate is confirmed. Once confirmed, the sustainable data transfer rate for data write operations to the presently coupled external memory medium 260 is forwarded via connection 259 to each of the data acquisition system 230 and the data processing system 240. Each of the data acquisition system 230 and the data processing system 240 are configured to select and apply one or more data acquisition parameter values and data processing parameter values, respectively in accordance with the sustainable data transfer rate. Note that one or more values associated with respective operational parameters may not change as a result of the data transfer calibration.

When a sustainable data read speed is desired, memory interface 250 retrieves and forwards test file 222 to the external memory medium 260. Once the data transfer is complete, memory interface 250 begins to retrieve the test file 222 from external memory medium 260 at a predetermined bit rate. If a data transfer error occurs, memory interface 250 adjusts the bit rate until a sustainable data transfer rate is confirmed. The sustainable data transfer rate for data read operations from the presently coupled external memory medium 260 is forwarded via connection 259 to each of the data acquisition system 230 and the data processing system 240. Each of the data acquisition system 230 and the data processing system 240 are configured to select and apply one or more data acquisition parameters values and data processing parameter values, respectively in accordance with the sustainable data transfer rate. Note that one or more values associated with respective operational parameters may not change as a result of the data transfer calibration.

The systems and methods for responding to a data transfer can be implemented using combinations of hardware, software, or firmware. In the illustrated embodiment(s), the systems and methods are implemented using a combination of hardware and software that is stored in an internal memory and that is executed by a suitable instruction execution system provided within an ASIC.

Hardware components of the systems for responding to a data transfer can be implemented with any or a combination of the following alternative technologies, which are all well known in the art: discrete logic circuit(s) having logic gates for implementing logic functions upon data signals, an application specific integrated circuit (ASIC) having appropriate combinational logic gates (as described in the illustrated embodiment), a programmable gate array(s) (PGA), a field programmable gate array (FPGA), etc.

Software or firmware components of the systems for responding to a data transfer can be stored in one or more memory elements and executed by a suitable general purpose or application specific processor. Software or firmware for determining a sustainable data transfer rate and or for selecting a value for at least one operational parameter associated with a digital appliance and/or a digital camera, which comprises an ordered listing of executable instructions and data for implementing logical functions, can be embodied in any computer-readable medium for use by, or in connection with, an instruction execution system, apparatus, or device, such as an appropriately configured processor-containing camera or other system that can fetch the instructions from the instruction execution system and execute the instructions. Those of ordinary skill will understand that software or firmware components of the systems for responding to a data transfer can be stored on and later read from a computer-readable medium. In the context of this document, a "computer-readable medium" can be any means that can contain, store, communicate, propagate, or transport the program for use by or in connection with the instruction execution system.

Any process descriptions or blocks in the flow diagrams illustrated in FIGS. 3-7 should be understood as representing steps in an associated process. Alternative implementations are included within the scope of the present methods for responding to a data transfer. For example, functions may be executed out-of-order from that shown or discussed, including substantially concurrently or in reverse order, depending on the functionality involved.

Figure 3:
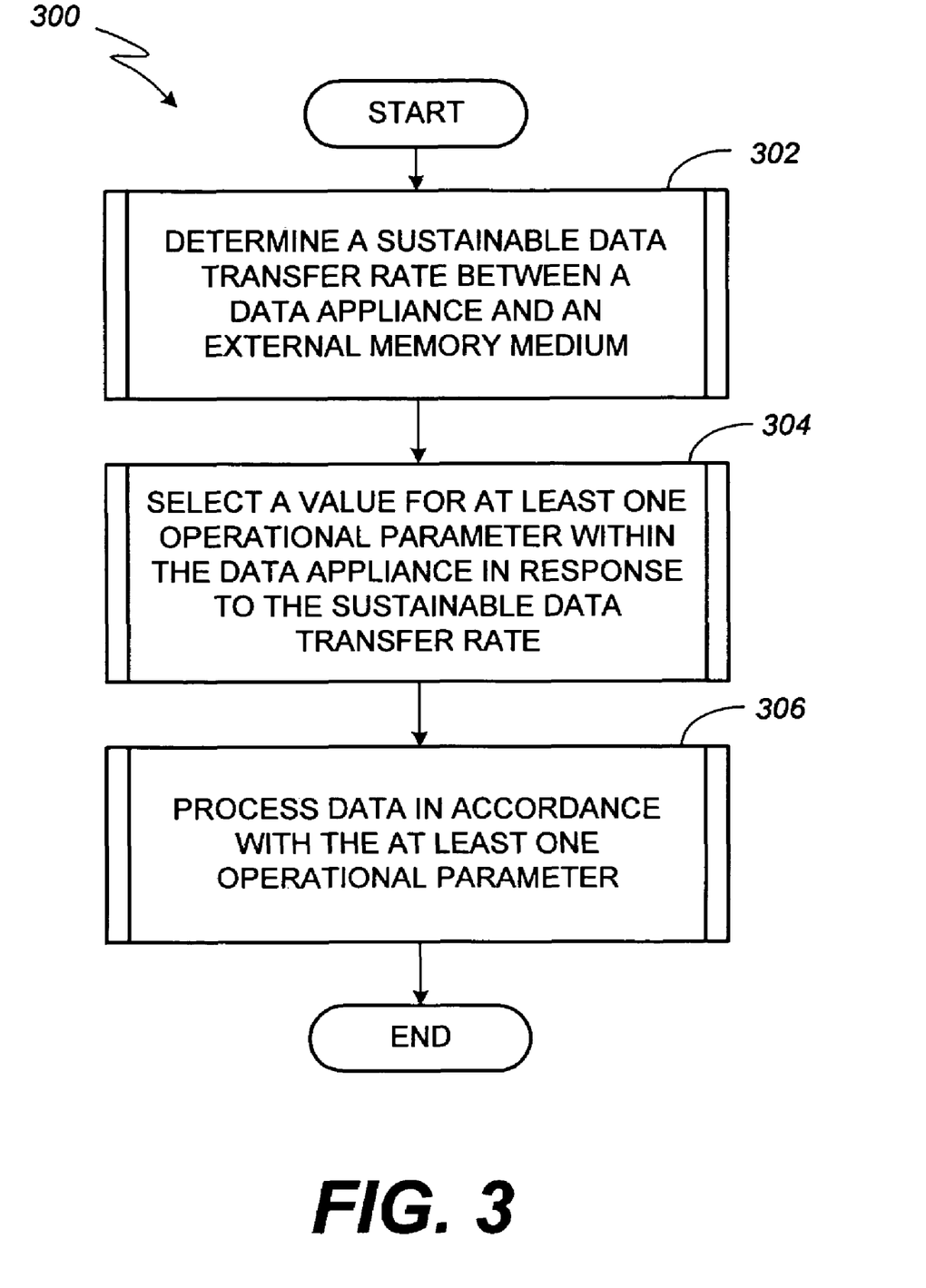
FIG. 3 is a flow diagram illustrating an embodiment of a method for responding to a data transfer that can be implemented by the data appliance of FIG. 1.

FIG. 3 is a flow diagram illustrating an embodiment of a method for responding to a data transfer that can be implemented by the data appliance 100 of FIG. 1. As shown in FIG. 3, method 300 begins with data appliance 100 determining a sustainable data transfer rate for data transfers to and/or from an external memory medium coupled to the respective device as indicated in block 302. After a sustainable data transfer rate is determined for the contemplated data transfer operation (e.g., a data write operation when transferring data from the respective device to the external memory medium), a value for at least one operational parameter within the data appliance 100 is selected in response to the sustainable data transfer rate as indicated in block 304. Thereafter, as illustrated in block 306 data is processed by the data appliance 100 in accordance with the at least one operational parameter.

Figure 4:
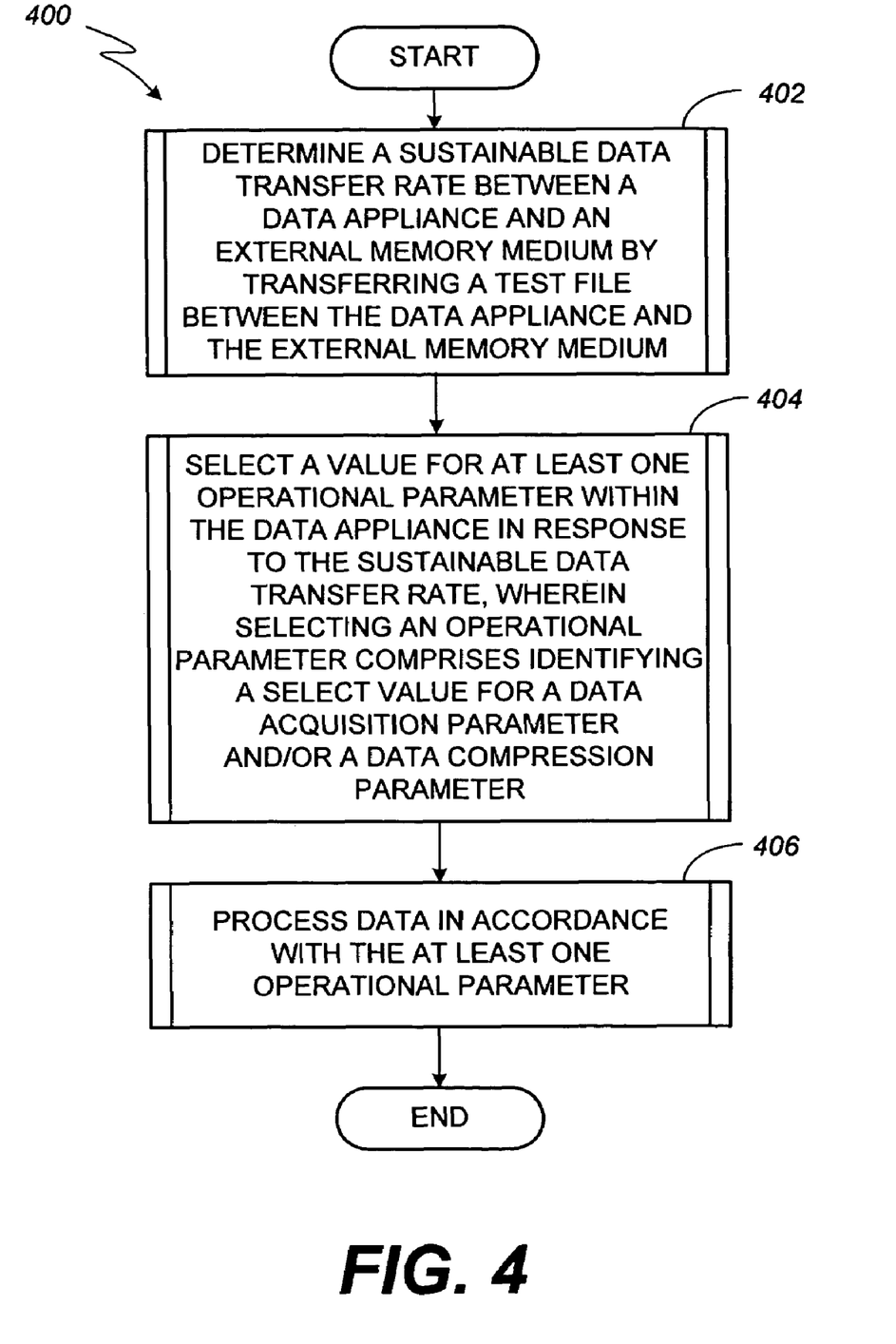
FIG. 4 is a flow diagram illustrating an alternative embodiment of a method for responding to a data transfer.

FIG. 4 is a flow diagram illustrating an alternative embodiment of a method for responding to a data transfer. As shown in FIG. 4, method 400 begins with block 402 where data appliance 100 determines a sustainable data transfer rate for data transfers to and/or from an external memory medium coupled to the respective device. As further indicated in block 402, the sustainable data transfer rate is determined by transferring a test file between the data appliance 100 and the external memory medium. A system clock can be used to log relative start and stop times associated with complete and/or partial test file transfers. The relative start and stop times can be used to determine an elapsed time. The number of bytes successfully transferred to/from the external memory medium over the elapsed time determines a sustainable data transfer rate. As described above, any of a number of algorithms may be implemented to determine an optimized sustainable data transfer rate between the data appliance 100 and the external memory medium.

After a sustainable data transfer rate is determined for the contemplated data transfer operation (e.g., a data write operation when transferring data from the respective device to the external memory medium), a value for at least one operational parameter within the data appliance 100 is selected in response to the sustainable data transfer rate as indicated in block 404. As further indicated in block 404, the at least one operational parameter comprises at least one of a data acquisition parameter and/or a data compression parameter. Thereafter, as illustrated in block 406 data is processed by the data appliance 100 in accordance with the at least one operational parameter and perhaps other operational parameters associated with the data appliance 100.

Figure 5:
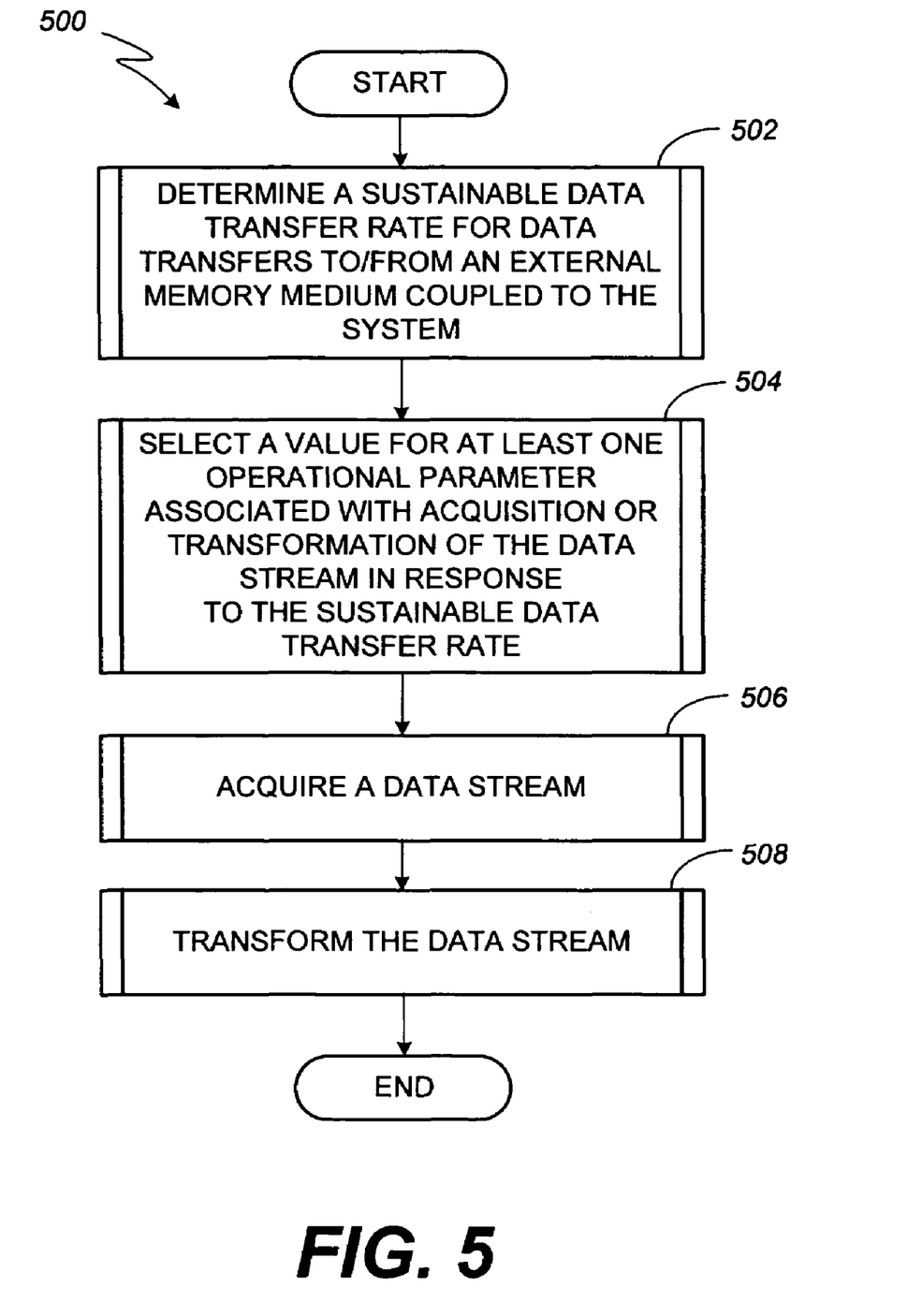
FIG. 5 is a flow diagram illustrating an embodiment of a method for processing a data stream that can be implemented by either of the data appliance of FIG. 1 or the digital camera of FIG. 2.

FIG. 5 is a flow diagram illustrating an embodiment of a method for responding to a data transfer that can be implemented by either of the data appliance of FIG. 1 or the digital camera of FIG. 2. As shown in FIG. 5, method 500 begins with data appliance 100 or digital camera 200 determining a sustainable data transfer rate for data transfers to and/or from an external memory medium coupled to the respective device as indicated in block 502. After a sustainable data transfer rate is determined for the contemplated data transfer operation (e.g., a data write operation when transferring data from the respective device to the external memory medium), a value for at least one operational parameter associated with data acquisition and/or data transformation is selected in response to the sustainable data transfer rate as indicated in block 504.

Thereafter, as illustrated in block 506 a data stream is acquired in accordance with one or more operational parameters associated with data acquisition. Data acquisition parameters include at least spatial resolution and frame rate when video data is transferred between the data appliance 100 or the digital camera 200 and an external memory medium coupled to the respective device. Note that data may or may not be acquired in accordance with an operational parameter that was adjusted in block 504. That is, data may be acquired using one or more predetermined values for data acquisition parameters that match a select value(s).

Once the data stream is acquired as indicated in block 506, the respective device transforms the data stream in accordance with one or more operational parameters associated with data processing as indicated in block 508. Note that data may or may not be processed in accordance with an operational parameter that was adjusted in block 504. That is, data may be acquired using one or more predetermined values for data compression parameters that match a select value(s). Transformation of the data stream may include data formatting into a standard data format suitable for conveying acquired data in near real time as well as data compression techniques.

Figure 6:
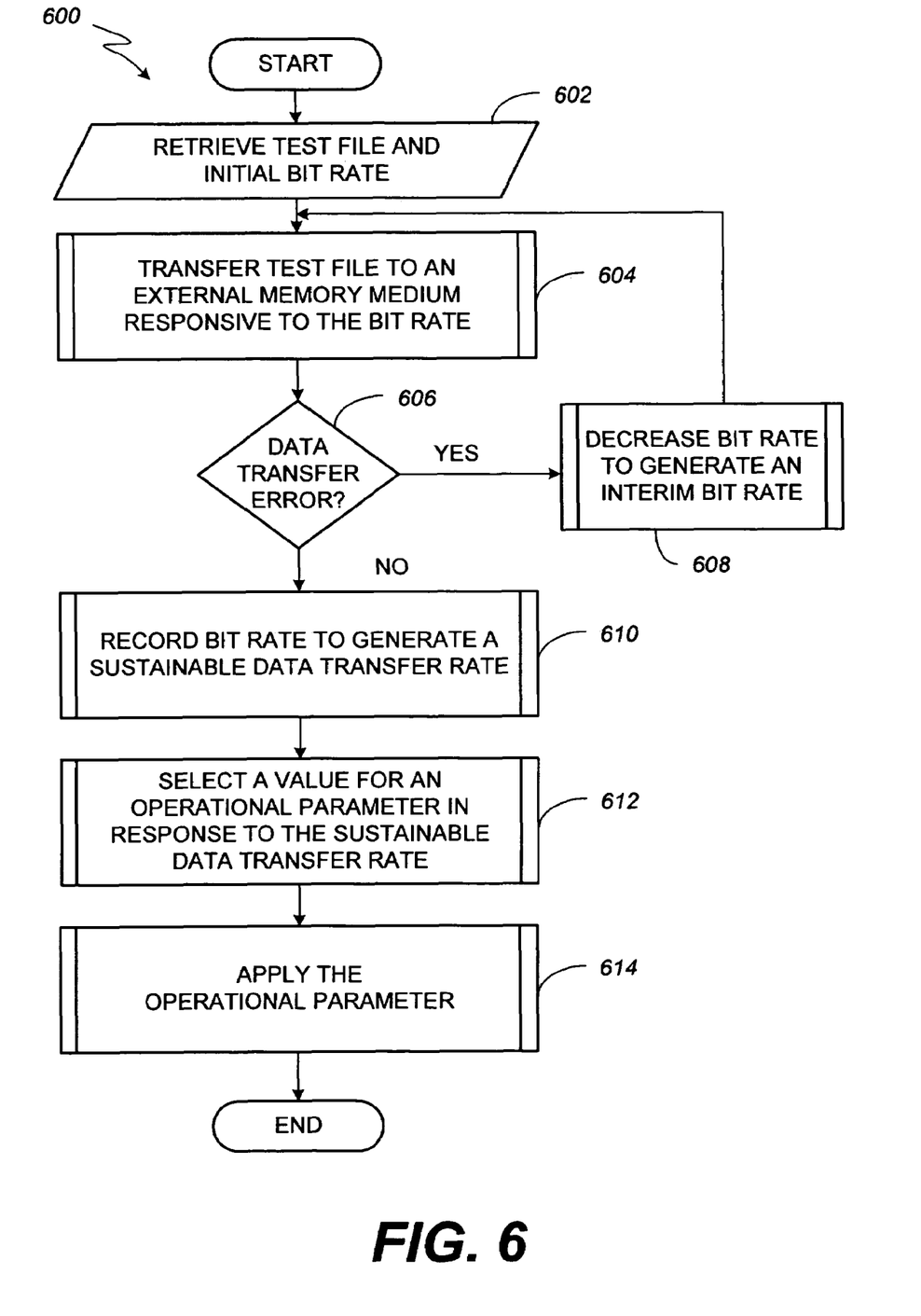
FIG. 6 is a flow diagram illustrating an embodiment of a method for configuring the data appliance of FIG. 1 or the digital camera of FIG. 2 in accordance with the result of a data write operation.

FIG. 6 is a flow diagram illustrating an embodiment of a method for configuring the data appliance of FIG. 1 or the digital camera of FIG. 2 in accordance with the result of a data write operation. As illustrated in FIG. 6, method 600 begins with data appliance 100 or digital camera 200 retrieving a test file and an initial bit rate for driving a data transfer as indicated in input/output block 602. Thereafter, as indicated in block 604, the respective device transfers the test file to an external memory medium responsive to the bit rate. Decision block 606 illustrates that during and/or after completion of the data transfer the respective device monitors the transfer of the test file for a data transfer error. When an error condition is detected as indicated by the flow control arrow exiting decision block 606, labeled "YES," the respective device responds by decreasing the bit rate to generate an interim bit rate, as indicated in block 608. The functions of blocks 604 through 608 are repeated until a data transfer error is no longer detected.

Otherwise, when a data transfer error is not detected as indicated by the flow control arrow exiting decision block 606, labeled "NO," the respective device responds by recording the bit rate to generate a sustainable data transfer rate, as indicated in block 610. Thereafter, as illustrated in block 612, the respective device selects a value for an operational parameter in response to the sustainable data transfer rate. Next, the respective device applies the operational parameter, as illustrated in block 614.

Figure 7:
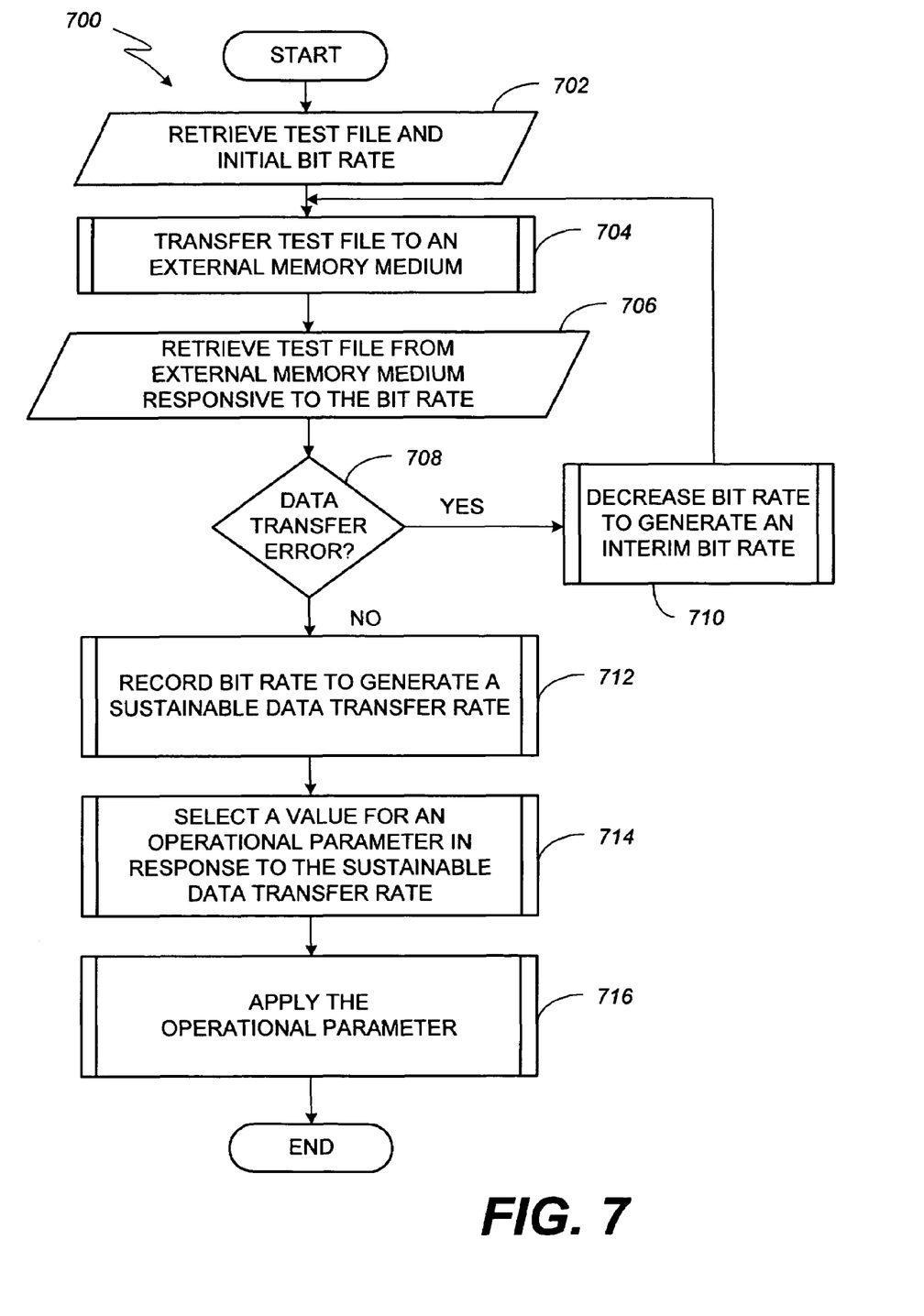
FIG. 7 is a flow diagram illustrating an embodiment of a method for configuring the data appliance of FIG. 1 or the digital camera of FIG. 2 in accordance with the result of a data read operation.

FIG. 7 is a flow diagram illustrating an embodiment of a method for configuring the data appliance of FIG. 1 or the digital camera of FIG. 2 in accordance with the result of a data read operation. As illustrated in FIG. 7, method 700 begins with data appliance 100 or digital camera 200 retrieving a test file and an initial bit rate for driving a data transfer as indicated in input/output block 702. The respective device transfers the test file to the external memory medium as illustrated in block 704. Thereafter, as indicated in block 706, the respective device retrieves the test file from the external memory medium responsive to the bit rate. Decision block 708 illustrates that during and/or after completion of the data transfer the respective device monitors the transfer of the test file for a data transfer error. When an error condition is detected as indicated by the flow control arrow exiting decision block 708, labeled "YES," the respective device responds by decreasing the bit rate to generate an interim bit rate, as indicated in block 710. The functions of blocks 704 through 710 are repeated until a data transfer error is no longer detected.

Otherwise, when a data transfer error is not detected as indicated by the flow control arrow exiting decision block 708, labeled "NO," the respective device responds by recording the bit rate to generate a sustainable data transfer rate, as indicated in block 712. Thereafter, as illustrated in block 714, the respective device selects a value for an operational parameter in response to the sustainable data transfer rate. Next, the respective device applies the operational parameter, as illustrated in block 716.

It should be emphasized that the above-described embodiments are merely examples of implementations of the systems and methods for responding to a data transfer. Many variations and modifications may be made to the above-described embodiments. All such modifications and variations are intended to be included herein within the scope of this disclosure and protected by the following claims.

What is claimed is:

1. A method for dynamically processing data, the method comprising the steps of:

determining a sustainable data transfer rate between a data appliance and an external memory medium that is directly connectable to the data appliance by transferring a test file and partial test files at predetermined data transfer rates, the test files containing digital representation of video data between the data appliance and the external memory medium;

establishing an image and video quality of data streaming rate using the test file and the partial test file, wherein a data streaming rate below a predetermined quality of image and video data threshold causes a data transfer error;

using an internal clock with monitoring logic associated with the data appliance to confirm data transfer rates associated with transfers of the test file and to log relative start and stop times associated with the test files, wherein if a data transfer error occurs, the predetermined data transfer rate is adjusted and the test file is re-transferred until a data transfer error does not occur;

using the test file and the partial test file to select values for operational parameter within the data appliance in response to the sustainable data transfer rate for maximizing the image and video quality of data that can be streamed to the external memory medium;

processing data in accordance with the at least one operational parameter;

wherein selecting values for the operational parameters comprises changing a bit rate, a frame type, and a search area for motion vectors for an identified data compression parameter and changing a value associated with spatial resolution and frame rate for an identified data acquisition parameter.

2. The method of claim 1, wherein transferring a test file between the data appliance and the external memory medium comprises reading or writing the test file at an initial bit rate that matches a maximum rate supported by the data appliance.

3. The method of claim 1, wherein selecting a value for at least one operational parameter in response to the sustainable data transfer rate comprises determining a desired data transfer rate responsive to the sustainable data transfer rate.

4. A data appliance, comprising:
an acquisition system configured to acquire data in response to an acquisition parameter;
a processing system coupled to the acquisition system, the processing system configured to transform data in response to processing parameters;
a memory interface coupled to the processing system, wherein the data appliance configured to select values associated with acquisition parameters and the processing parameters responsive to a sustainable data transfer rate between the memory interface and an external memory medium that is directly connectable to the data appliance by transferring a test file and partial test files at predetermined data transfer rates, the test files containing a digital representation of video data between the data appliance and the external memory medium;
wherein the processing system uses the test file and the partial test file to establish an image and video quality of data streaming rate and wherein a data streaming rate below a predetermined quality of image and video data threshold causes a data transfer error; and
an internal clock with monitoring logic associated with the data appliance configured to confirm data transfer rates associated with transfers of the test file and to log relative start and stop times associated with the test files, wherein if a data transfer error occurs, the predetermined data transfer rate is adjusted and the test file is re-transferred until a data transfer error does not occur for maximizing the image and video quality of data that can be streamed to the external memory medium;
wherein the data acquisition and processing parameters use the test file and the partial test file and to select values and wherein selecting values include changing a bit rate, a frame type, and a search area for motion vectors for an identified data compression parameter and changing a value associated with spatial resolution and frame rate for an identified data acquisition parameter.

5. The appliance of claim 4, further comprising:
an internal memory configured to store the test file.

6. The appliance of claim 5, wherein if a data transfer error is detected after transferring the test file, an interim bit rate less than an initial bit rate by a predetermined amount is used for a remainder of data transfer and/or subsequent data transfers and wherein after the bit rate has been decreased, the data transfer resumes until another data transfer error condition occurs or the data transfer is completed so that data transfers and bit rate adjustments repeat until no data error is detected during a transfer of the test file.

7. The appliance of claim 4, wherein the sustainable data transfer rate is associated with a data write operation.

8. The appliance of claim 4, wherein the sustainable data transfer rate is associated with a data read operation.

9. The appliance of claim 4, wherein the data appliance comprises a digital camera.

10. The appliance of claim 4, wherein the data appliance applies a predetermined set of parameter values responsive to a range of sustainable data transfer rates between the memory interface and an external memory medium.

11. A system for responding to a data transfer rate, the system configured for use in a data appliance, the system comprising:
means for determining a sustainable data transfer rate for data transfers to/from an external memory medium that directly connects to the data appliance by transferring a test file and partial test files at predetermined data transfer rates, the test files containing a digital representation of video data between the data appliance and the external memory medium; means for acquiring a data stream;
means for transforming the data stream;
means for establishing an image and video quality of data streaming rate using the test file and the partial test file, wherein a data streaming rate below a predetermined quality of image and video data threshold causes a data transfer error,
means for using the test file and the partial test file to select values for operational parameters associated with the means for acquiring or the means for transforming the data stream in response to the sustainable data transfer rate;
means for using an internal clock with monitoring logic associated with the data appliance to confirm data transfer rates associated with transfers of the test file and to log relative start and stop times associated with the test files, wherein if a data transfer error occurs, the predetermined data transfer rate is adjusted and the test file is re-transferred until a data transfer error does not occur for maximizing the image and video quality of data that can be streamed to the external memory medium; and
wherein selecting values for the operational parameters comprises changing a bit rate, a frame type, and a search area for motion vectors for an identified data compression parameter and changing a value associated with spatial resolution and frame rate for an identified data acquisition parameter.

12. The system of claim 11, wherein the means for transforming the data stream is responsive to at least one processing parameter.

13. The system of claim 12, wherein the at least one processing parameter comprises a video data compression parameter.

14. A computer-readable storage medium of a data appliance having stored thereon an executable instruction set, the instruction set, when executed by a processor, directing the processor to perform a method comprising:
retrieving a test file and partial test files at predetermined data transfer rates, the test files containing a digital representation of video data and an initial bit rate;
transferring the test file to an external memory medium that is directly connectable to the data appliance;
establishing an image and video quality of data streaming rate by using the test file and the partial test file, wherein a data streaming rate below a predetermined quality of image and video data threshold causes a data transfer error;
determining if a data transfer error condition exists by using an internal clock with monitoring logic associated with the data appliance to confirm data transfer rates associated with transfers of the test file and by logging relative start and stop times associated with the test files;

when it is the case that no data transfer error exists, recording the bit rate to generate a sustainable data transfer rate;

when it is the case that a data transfer error exists, decreasing the bit rate to generate an interim bit rate less than an initial bit rate by a predetermined amount for a remainder of data transfer and/or subsequent data transfers and repeating the transferring, determining, decreasing, and recording steps until another data transfer error condition occurs or the data transfer is completed so that data transfers and bit rate adjustments repeat until no data error is detected during a transfer of the test file for maximizing the image and video quality of data that can be streamed to the external memory medium; and selecting values for operational parameters by changing a bit rate, a frame type, and a search area for motion vectors for identified data compression parameters and changing a value associated with spatial resolution and frame rate for identified data acquisition parameters.

15. The computer-readable storage medium of claim 14, wherein retrieving the test file and a bit rate comprises retrieving video data.

16. The computer-readable storage medium of claim 14, wherein the data transfer error comprises a write operation error.

17. The computer-readable storage medium of claim 14, further comprising:

selecting at least one operational parameter in response to the sustainable data rate; and applying the operational parameter.

18. The computer-readable storage medium of claim 17, wherein the operational parameter is at least one of an acquisition parameter and a data compression parameter.

19. The computer-readable storage medium of claim 14, the method further comprising: retrieving the test file from the external memory medium responsive to the initial bit rate.

20. The computer-readable storage medium of claim 19, wherein the data transfer error comprises a read operation error.

21. A digital camera, comprising:

an image acquisition system configured to generate a video data stream;

a data processing system configured to receive and transform the video data stream to generate a compressed data stream;

an external memory interface coupled to the data processing system and configured to feed back a sustainable data transfer rate to one of the image acquisition system and the data processing system, the sustainable data transfer rate established as an image and video quality of data streaming rate using a test file and a partial test file, wherein a data streaming rate below a predetermined quality of image and video data threshold causes a data transfer error, wherein the sustainable data transfer rate is related to the rate at which data can be transferred between the external memory interface and a removable memory card that couples to the external memory interface, wherein the sustainable data transfer rate is determined by transferring the test file and the partial test files at predetermined data transfer rates, the test files containing a digital representation of video data between the data appliance and the external memory medium; and an internal clock with monitoring logic associated with the data appliance configured to confirm data transfer rates associated with transfers of the test file and to log relative start and stop times associated with the test files, wherein if a data transfer error occurs, the predetermined data transfer rate is adjusted and the test file is re-transferred until a data transfer error does not occur for maximizing the image and video quality of data that can be streamed to the external memory medium;

wherein values are selected for the data processing system including changing a bit rate, a frame type, and a search area for motion vectors for an identified data compression parameter and for the image acquisition system for changing values associated with spatial resolution and frame rate for an identified data acquisition parameter.

22. The digital camera of claim 21, wherein the sustainable data transfer rate is responsive to a data write operation.

23. The digital camera of claim 21, wherein the sustainable data transfer rate is responsive to a data read operation.

24. The method of claim 1, wherein the external memory medium is a removable flash memory card.

25. The appliance of claim 4, wherein the external memory medium is a removable flash memory card.

26. The system of claim 11, wherein the external memory medium is a removable flash memory card.

27. The computer-readable medium of claim 14, wherein the external memory medium is a removable flash memory card.

28. The camera of claim 21, wherein the external memory medium is a removable flash memory card.

* * * * *